United States Patent [19]

Stroman et al.

[11] Patent Number: 5,077,477

[45] Date of Patent: Dec. 31, 1991

[54] METHOD AND APPARATUS FOR DETECTING PITS IN FRUIT

[75] Inventors: Richard Stroman, 2214 Humbolt Ave., Davis, Calif. 95616; Charles Kasmire, Davis, Calif.

[73] Assignee: Richard Stroman, Davis, Calif.

[21] Appl. No.: 626,486

[22] Filed: Dec. 12, 1990

[51] Int. Cl.$^5$ .................. G01N 21/55; G01N 21/59
[52] U.S. Cl. ............................. 250/349; 209/577; 250/223 R; 250/340; 250/341; 250/350; 250/351
[58] Field of Search .................. 209/577, 576; 250/223 R, 351, 350, 349, 341, 340

[56] References Cited

U.S. PATENT DOCUMENTS

| | | | |
|---|---|---|---|
| 3,005,549 | 10/1961 | Flanders et al. | 209/581 |
| 3,275,136 | 9/1966 | Allen et al. | 209/562 |
| 3,385,434 | 5/1968 | Nelson | 209/546 |
| 3,467,254 | 9/1969 | Simmons | 209/564 |
| 3,768,645 | 10/1973 | Conway et al. | 209/565 |
| 3,805,061 | 4/1974 | DeMissimy et al. | 250/209 |
| 3,930,994 | 1/1976 | Conway et al. | 209/579 |
| 4,279,346 | 7/1981 | McClure et al. | 209/582 |
| 4,534,470 | 8/1985 | Mills | 209/585 |
| 4,555,633 | 11/1985 | Björkelund | 250/560 |
| 4,666,045 | 5/1987 | Gillespie et al. | 209/585 |
| 4,825,068 | 4/1989 | Suzuki et al. | 250/223 R |
| 4,915,827 | 4/1990 | Rosenthal | 209/577 |

FOREIGN PATENT DOCUMENTS

| | | | |
|---|---|---|---|
| 933130 | 6/1982 | U.S.S.R. | 209/577 |
| 2142426 | 1/1985 | United Kingdom | 209/577 |

*Primary Examiner*—Constantine Hannaher
*Attorney, Agent, or Firm*—John P. O'Banion

[57] ABSTRACT

A method and apparatus for the detection of pits and abnormalities in various stone fruits. The apparatus transmits a first plurality of beams of light (18) across inspection zone (14) and transmits a second plurality of beams of light (22) across inspection zone (14) in a direction opposite to beams of light (18). As a stone fruit (10) passes through inspection zone (14), a first plurality of sensors (32) and a second plurality of sensors (34) detect the variations in the intensity of the transmitted beams of light. The light transmittance and reflectance characteristics of the stone fruit are analyzed to detect the presence of a pit or internal or external abnormality.

15 Claims, 8 Drawing Sheets

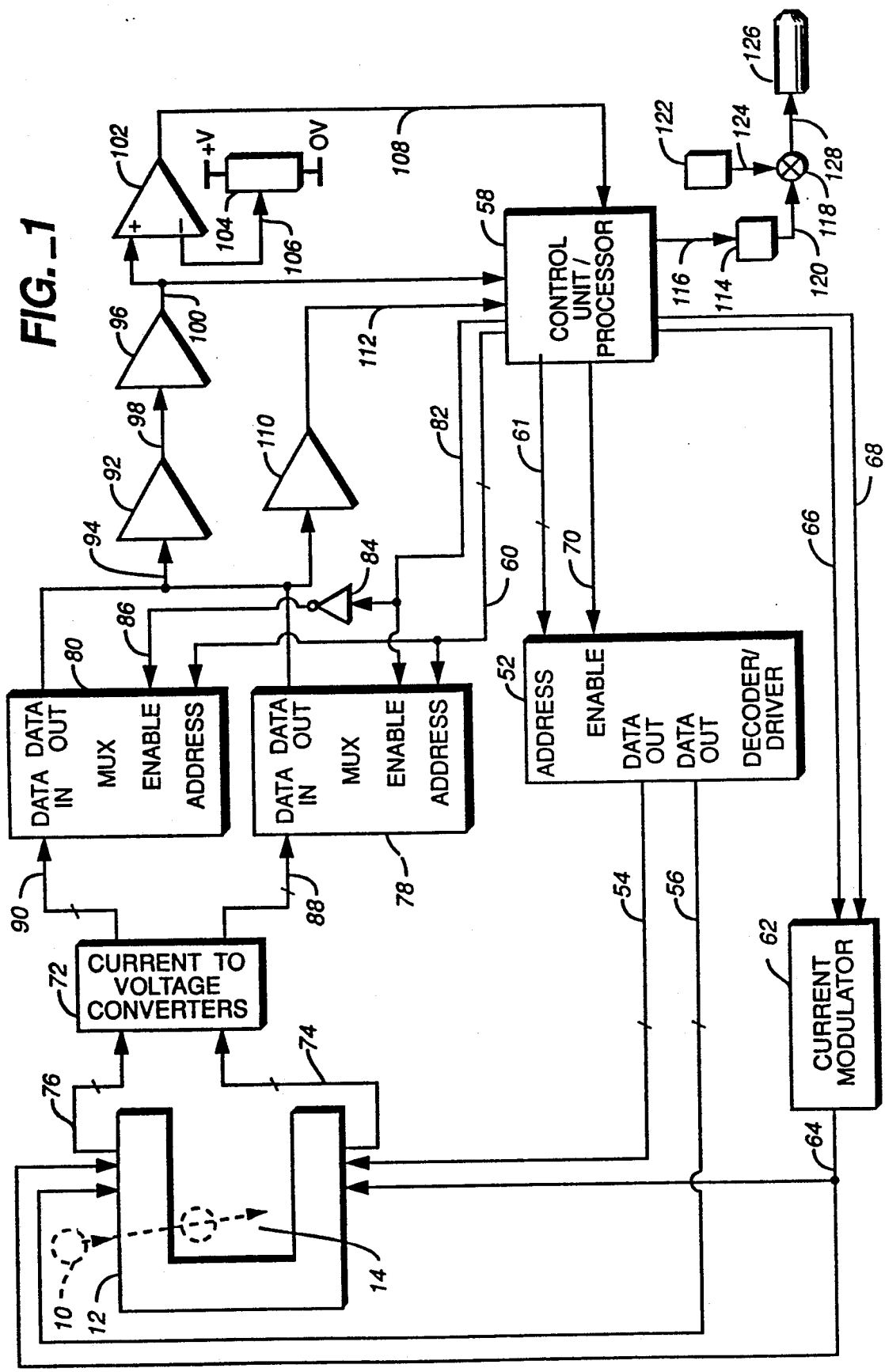
FIG._1

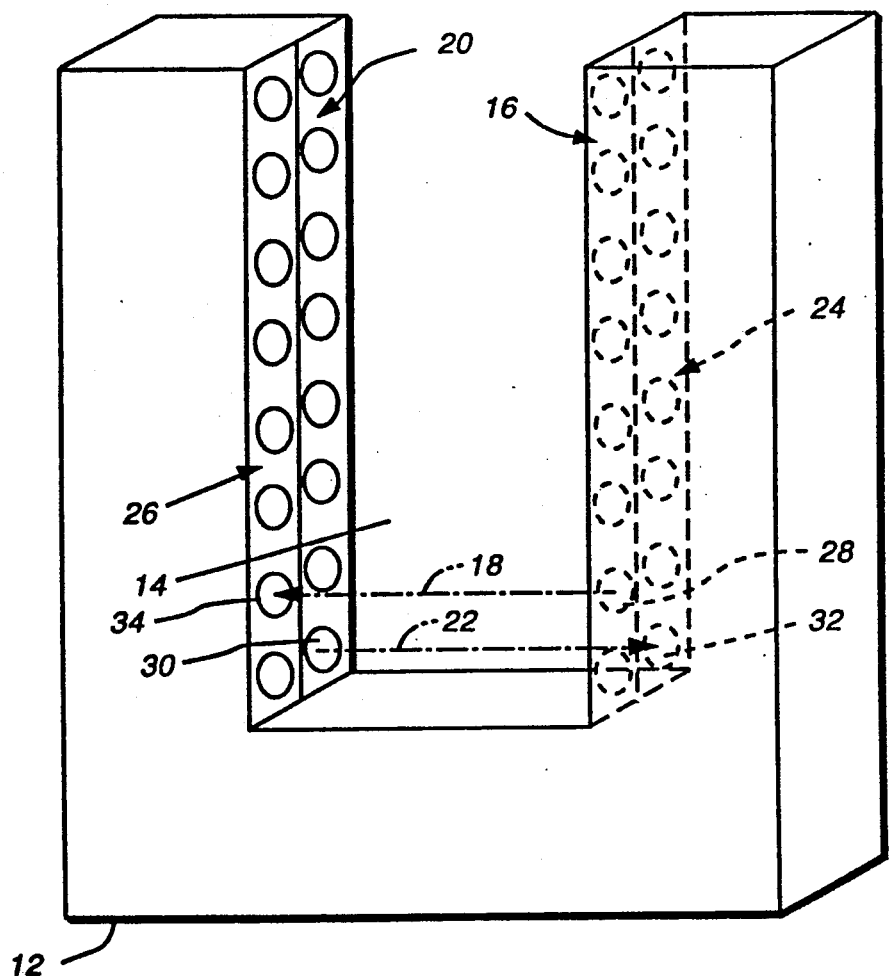
FIG._2
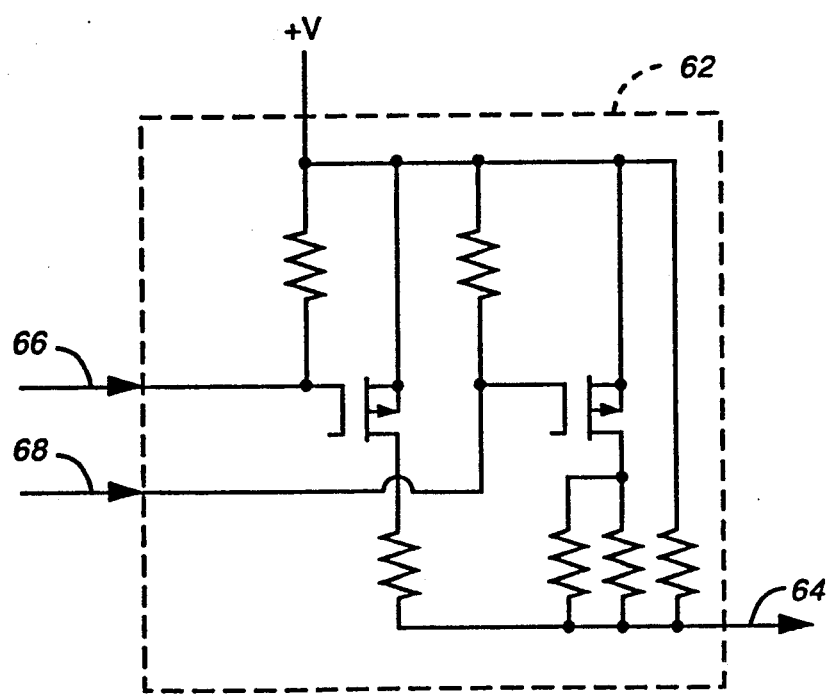
FIG._4

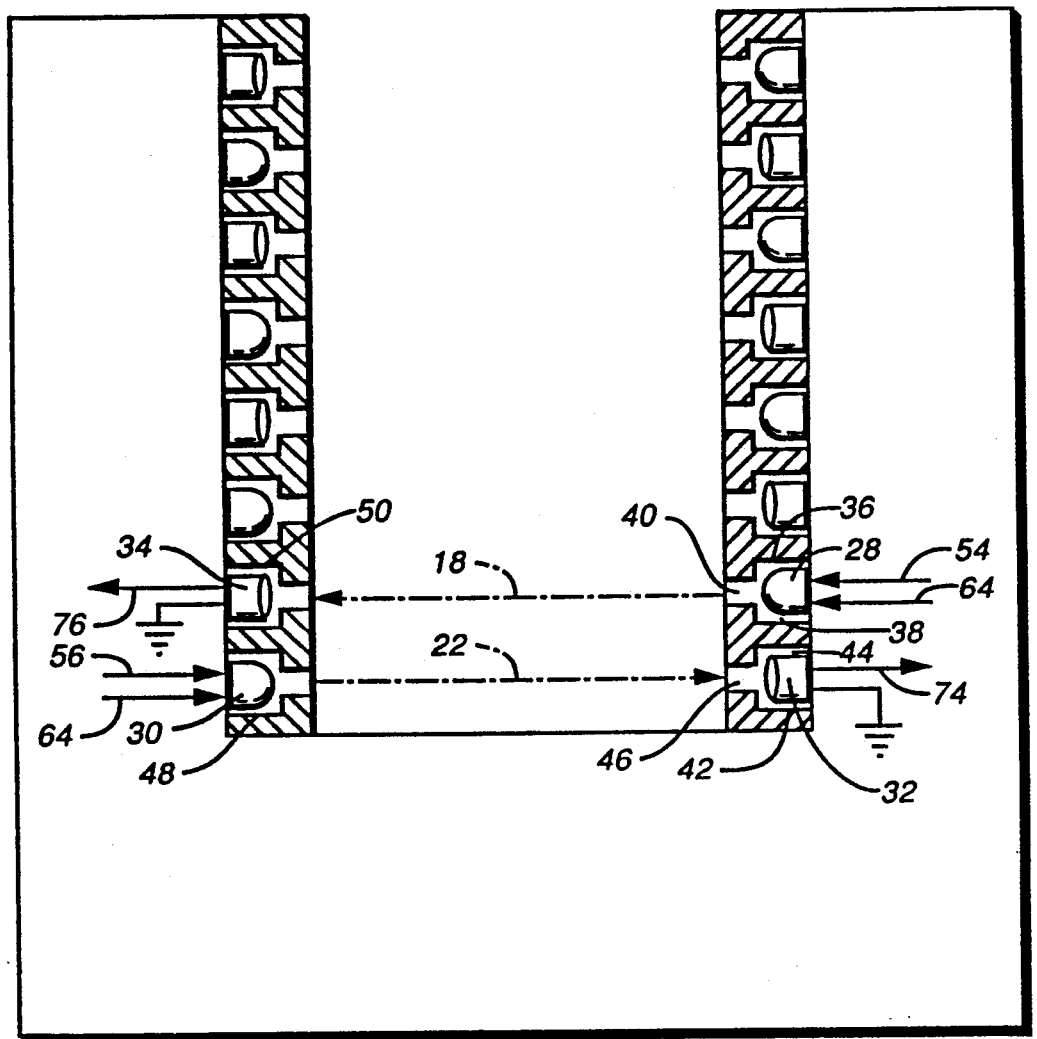
FIG._3

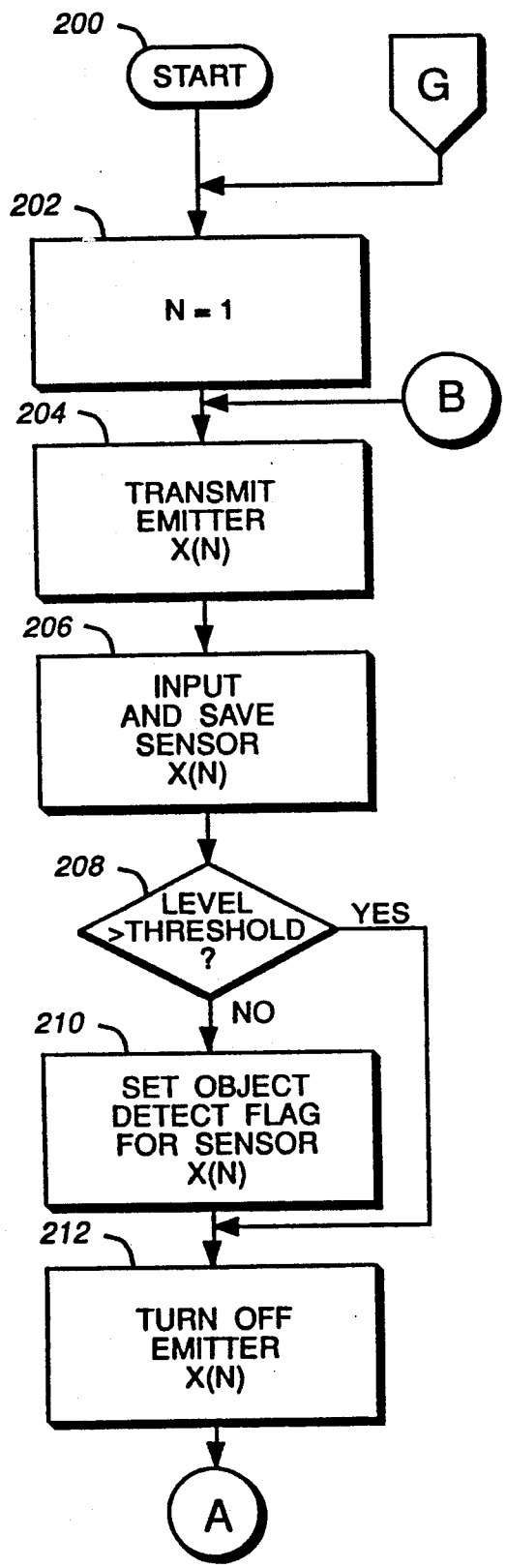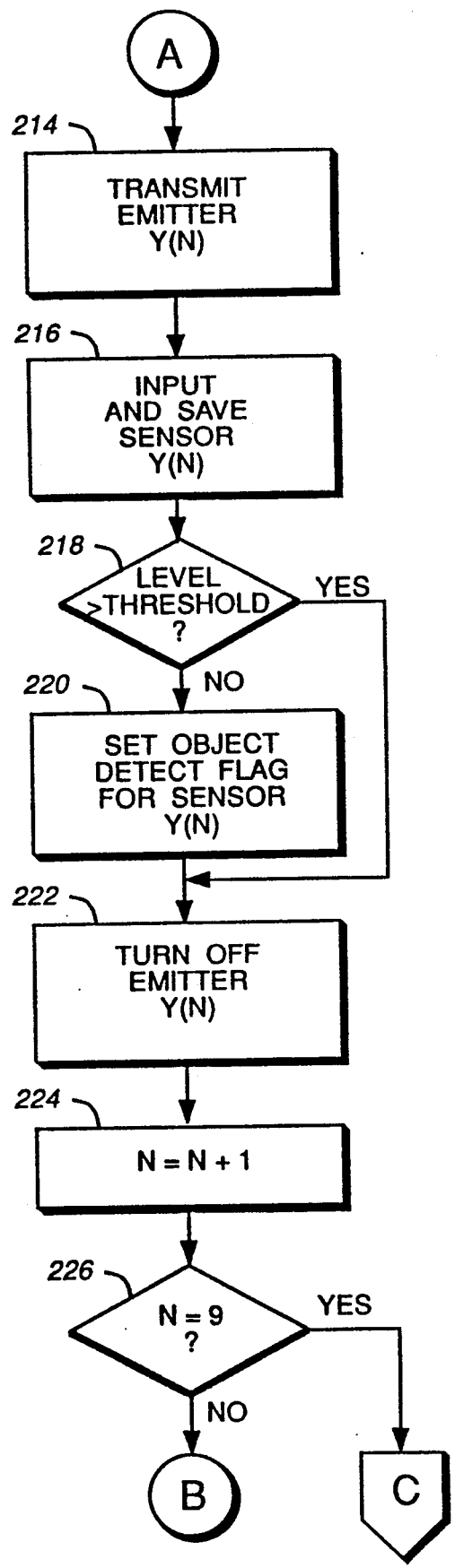
FIG._5A  FIG._5B

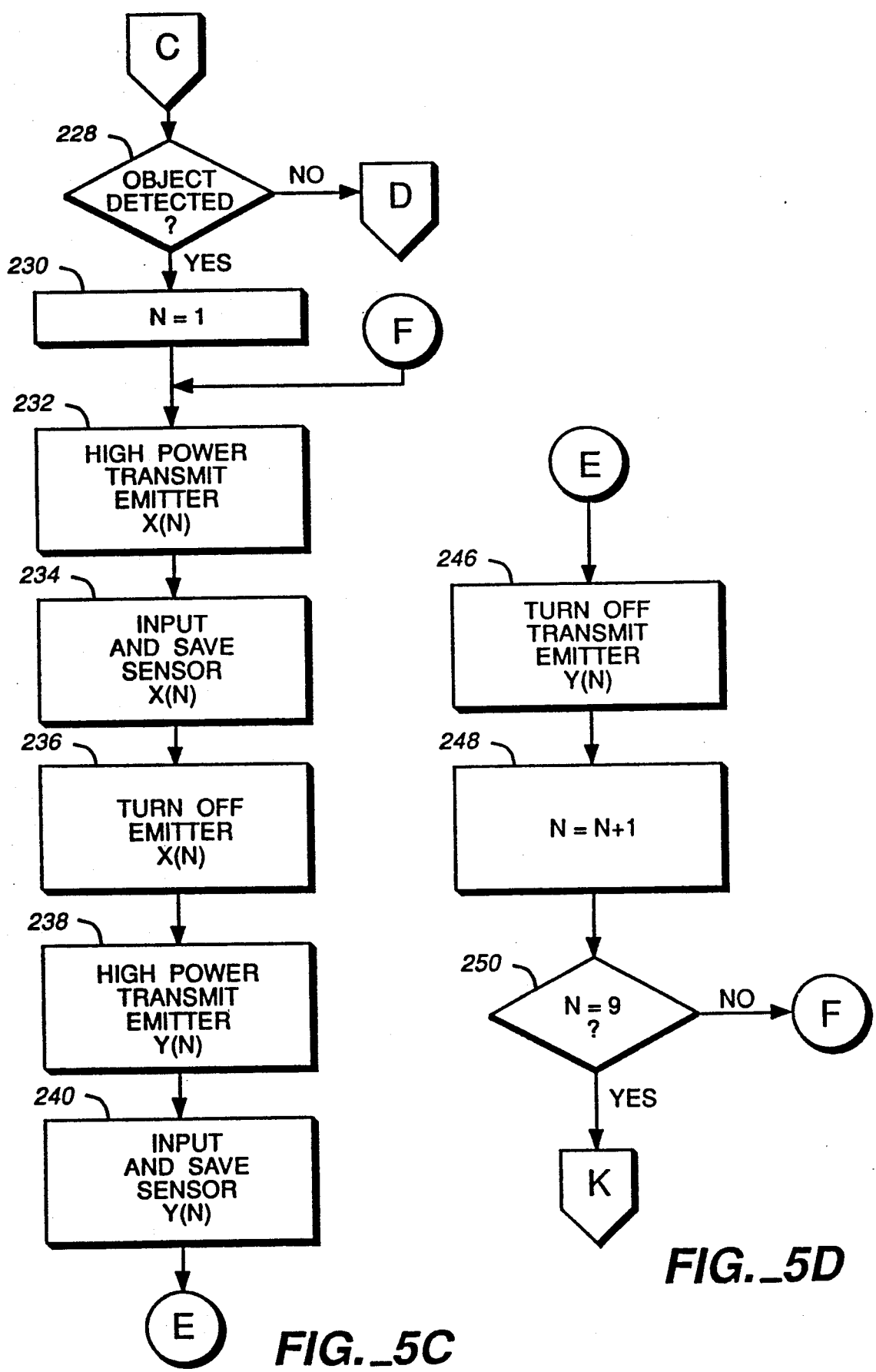
FIG._5C
FIG._5D

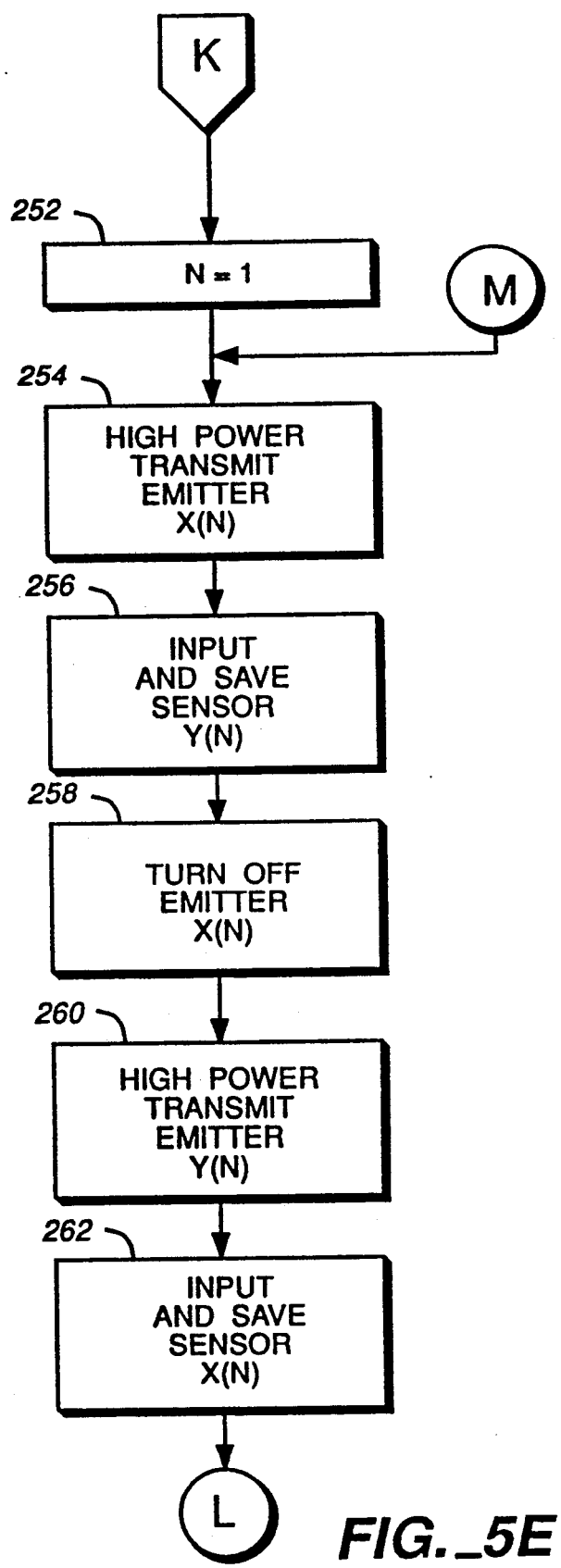
FIG._5E

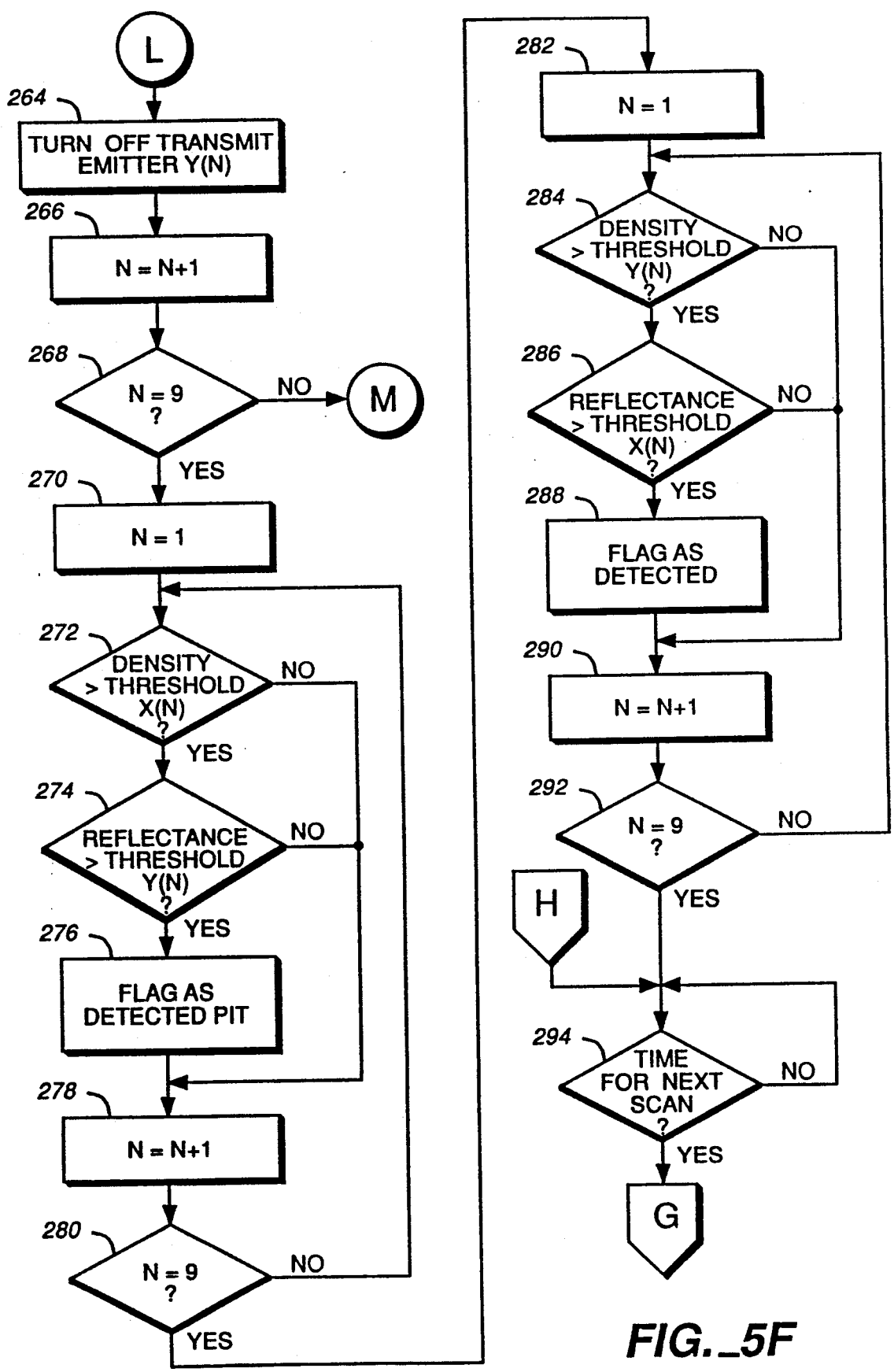
FIG._5F

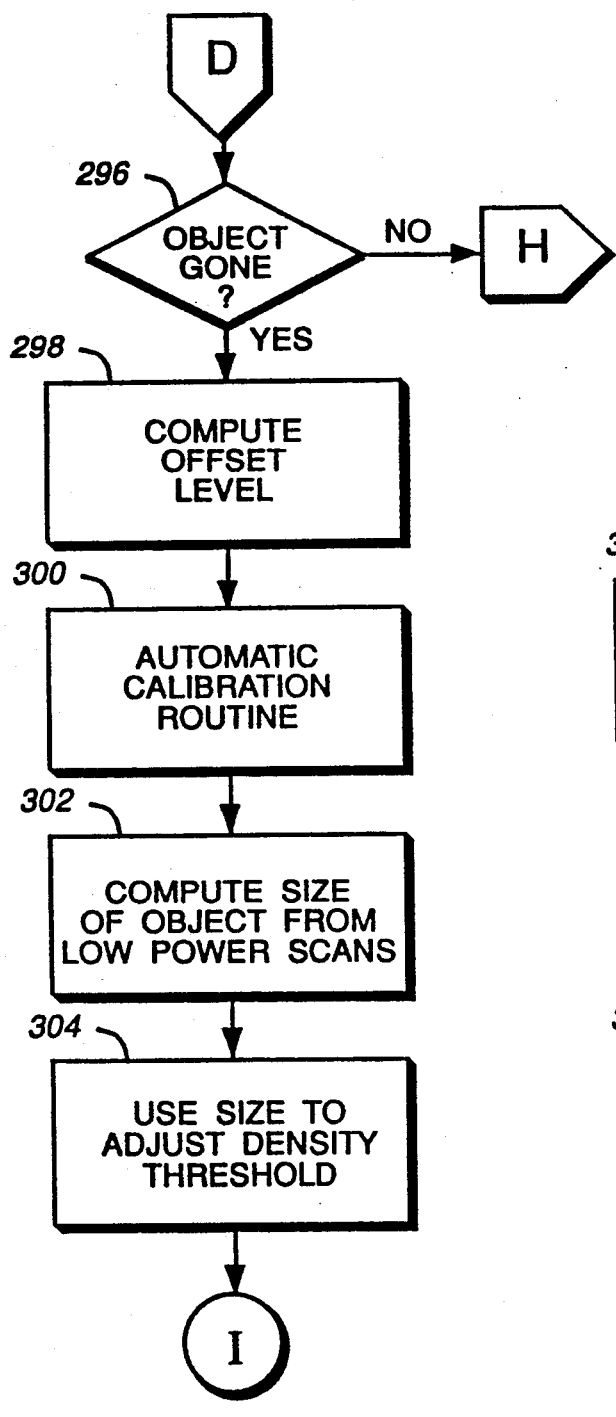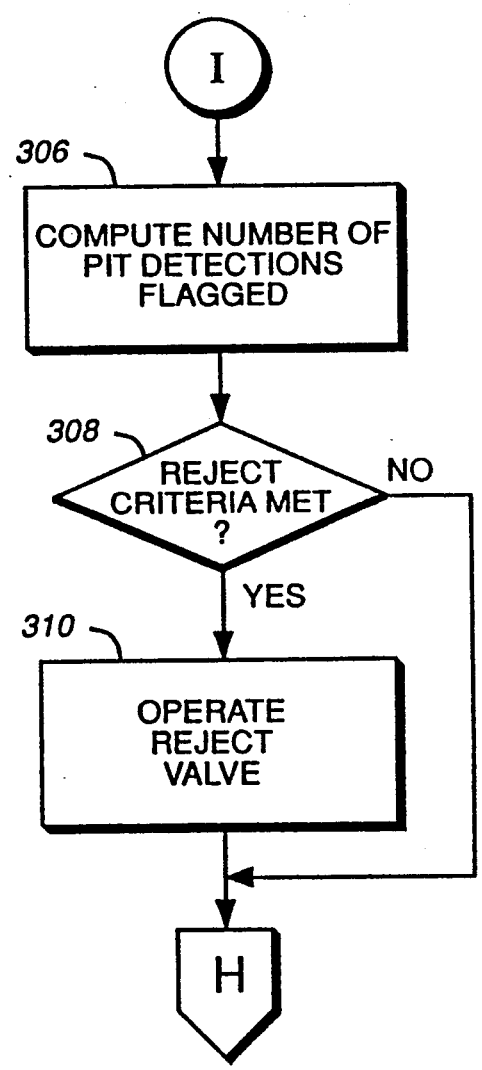
FIG._5G
FIG._5H

METHOD AND APPARATUS FOR DETECTING PITS IN FRUIT

BACKGROUND OF THE INVENTION

1. Field of the Invention

This invention pertains to the non-destructive internal and external inspection of produce, including the detection of pits in various stone fruits.

In the area of food processing and production, many stone fruits (e.g., peaches, apricots, cherries, prunes, dates and olives) are mechanically pitted. With the mechanical means available today, complete pit removal does not always occur. Often pits or pit fragments remain in the fruit after they have been through the mechanical pitting device and go undetected through the remainder of the processing stage. This could result in damage to equipment or an unwanted pit in the end product resulting in injury or death to persons.

The problem of pit detection has plagued food processors for many years and has resulted in the expenditure of large amounts of money in the replacement of equipment (slicers, dicers, etc.) which have been destroyed due to undetected pits and fragments. With regard to undetected pits in the end product, processors and insurance companies have faced the problem of product liability claims from injuries to the consumer. As a result, the industry has sought accurate and reliable means to detect and reject fruit which still contains pits or pit fragments after the fruit is mechanically pitted.

2. Description of the Background Art

Several types of automated devices have been developed to inspect produce for certain characteristics. For example, U.S. Pat. No. 3,467,254 issued to Simmons on Sept. 16, 1969, describes an apparatus for detecting pits or remnants in split peaches. U.S. Pat. No. 3,005,549 issued to Flanders et al. on Oct. 24, 1961, describes peach pit fragmentation detection means and techniques for peach halves. Both of these inventions require the fruit to be split in half before inspection, and further require specific orientation of the fruit in the apparatus. These inventions are directed to detecting pits and fragments in large fruits such as peaches, but not in smaller fruits such as cherries or olives or where the processor desires the fruit to remain whole.

U.S. Pat. No. 3,385,434 issued to Nelson on May 28, 1968, describes an apparatus for classifying objects according to their internal structure using light beams. This invention uses light beams to view the interior structure of kernels of corn and sort the kernels according to different interior colors, but would not distinguish between a pit in an article of fruit or some other type of variation in internal structure.

An apparatus for detecting seeds in small fruit such as cherries is described in U.S. Pat. No. 3,275,136 issued to Allen et al. on Sept. 27, 1966. In this invention, the pit must be positioned substantially in line with a light source thus making detection difficult if the pit is off center within the fruit or the fruit is irregularly shaped. Variations in size of the fruit could also make detection difficult.

U.S. Pat. No. 3,768,645 issued to Conway et al. on Oct. 30, 1973, describes a method and apparatus for evaluating articles of produce on the basis of their uniformity and non-uniformity to their transparency to x-rays. U.S. Pat. No. 3,930,994 issued to Conway et al. on Jan. 6, 1976, describes a method and apparatus similar to U.S. Pat. No. 3,768,645, but using light rays. In these inventions, the fruit must be preoriented which can make high speed evaluation difficult.

U.S. Pat. No. 4,534,470 issued to Mills on Aug. 13, 1985, shows an apparatus and method for processing and sorting fruit as a function of color, blemish, size, shape and other variables by uniformly illuminating the entire surface of the article. The invention does not detect light transmitted through the fruit which would be necessary for detection of a pit or internal abnormalities.

U.S. Pat. No. 4,666,045 issued to Gillespie et al. on May 19, 1987, describes an apparatus and method for detecting the presence of pits or pit fragments in fruit by subjecting the fruit to an optical scanning beam as the fruit passes through an inspection zone. With this invention, the fruit is scanned in only one dimension with a single sweeping scanning beam which could make detection difficult if the pit or pit fragment is not centered in the fruit or attaches to the external surface of the fruit after pitting. In addition, lack of symmetry of shape or discolorations or abnormalities on the surface of the fruit could be mistaken for a pit or cause pits to go undetected. Also, the physical size of the apparatus is impractical for commercial use.

U.S. Pat. No. 4,279,346 issued to McClure et al. on July 21, 1981, discloses a high speed asynchronous fruit sorter for sorting various types of fruits according to their maturity using optical density. However, this apparatus will not detect pits or pit fragments in fruit.

U.S. Pat. No. 4,555,633 issued to Bjorkelund on Nov. 26, 1985, discloses a method and device for measuring the presence and size of an object, such as a log, in a measuring zone based on intersecting light beams transmitted toward the object and the amount of light block by the object. Pit detection in fruit is not disclosed in this patent.

U.S. Pat. No. 4,825,068 issued to Suzuki et al. on Apr. 25, 1989, discloses a method and apparatus for inspecting the external appearance of articles such as fruit by reflecting images on four different side surfaces of the article, sensing the reflected images with a camera, and processing the photographed images to inspect form, size and surface conditions of the article. This patent does not disclose detection of pits in fruit.

Although the foregoing patents address some of the various needs of the industry, the devices and methods disclosed in those patents have certain sensitivities to size, shape, color, and orientation of the article of produce being inspected which my invention overcomes. Furthermore, fruit which contains pits which are off-center or pits which remain attached to the surface of the fruit after pitting can pose pit detection errors for the devices disclosed in the aforesaid patents.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

This invention pertains to a method and apparatus for the non-destructive internal and external inspection of produce, including the detection of pits in various stone fruits. The invention would generally be used for inspecting fruits with large stones such as peaches, apricots and prunes, but is adaptable for inspection of small fruits such as cherries, dates and olives. The invention can also be used to inspect non-stone fruits and vegetables. A more specific use would be for detecting unwanted pits in fruits such as peaches and apricots after those fruits are halved and pitted for commercial processing.

My co-pending application, Ser. No. 07/416,854, filed on Oct. 3, 1989, now U.S. Pat. No. 5,026,982, teaches a method and apparatus for detecting pits and internal and external abnormalities in produce by subjecting the article of produce to infrared light beams and determining the amount of light passing through the article in three dimensions. Quite surprisingly, I have now found that pits in certain types of produce can be accurately and economically detected by determining the amount of light passing through the article in only two dimensions, thus eliminating some of the complexity in the apparatus and method described in the aforesaid co-pending application. I have also found that the accuracy of the detection can be increased by evaluating not only the amount of light transmitted through the object but also the amount of light reflected off of the object.

By way of example and not of limitation, the invention comprises means for transmitting a first plurality of light beams across an inspection zone, means for transmitting a second plurality of light beams across the same inspection zone in a direction which is opposite to the direction of the first plurality of light beams, means for modulating the intensity of the light beams, means for sensing the intensity of each light beam after it passes through the inspection zone, means for sensing the intensity of the light reflected from the article of produce as it passes through the inspection zone, and means for analyzing variations in the intensity of the light beams transmitted through and reflected from an article of produce as it passes through the inspection zone. As an article of produce passes through the inspection zone, it is subjected to the light beams. Multiple scans of the article of produce are made as it passes through the inspection zone and, in effect, a two-dimensional "picture" is taken of the article of produce. The data is then analyzed to detect the presence of a pit based on the light transmission and absorption characteristics of the article of produce, or based on both the light transmittance/absorption and light reflectance characteristics of the article of produce.

An object of the invention is to inspect an article of produce without damage to the article being inspected.

Another object of the invention is to accurately detect pits in small or large stone fruits.

Another object of the invention is to inspect an article of produce both internally and externally without regard to size, shape, color, or ambient light conditions, or physical orientation.

Another object of the invention is to inspect articles of produce at high speeds.

Another object of the invention is to inspect both the internal and external structure of an article of produce with regard to optical density and/or optical density and reflectance.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a schematic block diagram of the electrical components of one embodiment of the invention.

FIG. 2 is a plan view of the transmitter/sensor assembly for the apparatus depicted in FIG. 1.

FIG. 3 is a plan view showing internal detail of the transmitter/sensor assembly depicted in FIG. 2.

FIG. 4 is a schematic diagram of the current modulator block element for the apparatus depicted in FIG. 1.

FIGS. 5A through 5H is a flow chart showing a typical sequence of instructions for use with a digital computer or microcomputer as the control unit/processor for the apparatus depicted in FIG. 1.

DESCRIPTION OF THE PREFERRED EMBODIMENTS

Referring more specifically to the drawings, for illustrative purposes the present invention is embodied in the apparatus generally shown in FIG. 1. It will be appreciated that the apparatus may vary as to configuration and as to details of the parts without departing from the basic concepts as disclosed herein.

Referring to FIG. 1 and FIG. 2, transmitter/sensor assembly 12 generally comprises a "U" shaped housing having three sides, two of which are parallel to each other. The area bounded by the three sides of transmitter/sensor assembly 12 defines inspection zone 14, through which article of produce 10 is passed. The size of inspection zone 14 is determined by the size of the article of produce 10 to be inspected and is naturally larger than article of produce 10. Rigidly affixed to one of the two parallel walls in transmitter/sensor assembly 12 is first transmitting means 16 for transmitting a first plurality of beams of light across inspection zone 14. Beam of light 18 is representative of one of the plurality of beams of light transmitted by first transmitting means 16.

Rigidly affixed to the opposite parallel wall of transmitter/sensor assembly 12 is second transmitting means 20 for trasmitting a second plurality of beams of light across inspection zone 14 in a direction opposite to the beams of light transmitted by first transmitting means 16. Beam of light 22 is representative of one of the plurality of beams of light transmitted by second transmitting means 20.

Situated adjacent to first transmitting means 16 is first sensing means 24. Situated adjacent to second transmitting means 20 is second sensing means 26.

It should be apparent that each of the two parallel walls in transmitter/sensor assembly 12 has both a transmitting means and a sensing means rigidly affixed to it.

In the preferred embodiment, first transmitting means 16 and first sensing means 24 are flush mounted to the inside wall of transmitter/sensor assembly 12 and do not project into inspection zone 14. Similarly, second transmitting means 20 and second sensing means 26 are flush mounted.

Referring to FIG. 2 and FIG. 3, first transmitting means 16 comprises a plurality of light sources 28 and second transmitting means 20 comprises a plurality of light sources 30. In the preferred embodiment, these light sources comprise high output infrared emitters where each emitter has an angle of light dispersion of approximately 12 degrees or less. Ideally, the wavelength of the infrared light emitted is in the range of approximately 880 to 940 nanometers. Other wavelengths, such as those of visible light, could be used depending upon the color of the article or produce 10, which could be particularly useful during a reflectance scan. Alternatively, additional transmitting means could be employed whereby both infrared emitters and emitters operating at other wavelengths, such as those of visible light, are used. In this embodiment, the infrared emitters produce substantially collimated beams of light which are not susceptible to color differences in article of produce 10. The visible light emitters would produce beams of light which are easily reflected from article of produce 10.

The number of light sources 28 in first transmitting means 16 and the number of light sources 30 in second transmitting means 20 is determined by the size of inspection zone 14. The light sources are spaced as close together as is possible while still assuring that the beams of light will not overlap. The size of inspection zone 14 is larger than article of produce 10 being inspected. In an embodiment for inspecting peaches or apricots, the preferred number of light sources 28 in first transmitting means 16 is eight, each mounted on two-tenths of an inch (5.08 millimeters) centers. There would also be eight light sources 30 in second transmitting means 20, each mounted on two-tenths of an inch (5.08 millimeters) centers.

First sensing means 24 comprises a plurality of light sensors 32 and second sensing means 26 comprises a plurality of light sensors 34. These light sensors produce an output signal proportionate to the intensity of the light sensed. In the preferred embodiment, these light sensors comprise infrared detectors where each detector has an individual lens and a field of vision of approximately twelve degrees or less. Individually lensed detectors with a narrow field of vision will reject ambient light and will further reject light which is scattered when the transmitted beams of light pass through article produce 10. This assures that the sensors only detect the light transmitted from their corresponding light sources. Alternatively, additional sensing means could be employed whereby both infrared sensors and sensors operating at other wavelengths, such as those of visible light, are used. In this embodiment, the infrared sensors would be used for sensing transmittance whereas the visible light sensors would be used for sensing reflectance characteristics of article of produce 10.

The number of light sensors 32 in first sensing means 24 corresponds to the number of light sources 30 in second transmitting means 20. The number of light sensors 34 in second sensing means 26 corresponds to the number of light sources 28 in first transmitting means 16.

To further collimate each beam of light 18, first transmitting means 16 further comprises first collimating means 36. First collimating means 36 has an insertion hole 38 for each light source 28. Opposite each insertion hole 38 is an exit aperture 40 which has a smaller diameter than the size of its corresponding light source 28. The result is that each beam of light 18 is directed toward its corresponding light sensor 34 as a highly collimated beam of light.

To further reduce detection of ambient and scattered light, first sensing means 24 further comprises first filtering means 42. First filtering means 42 has an insertion hole 44 for each light sensor 32. Opposite each insertion hole 44 is an entrance aperture 46 which has a smaller diameter than the size of its corresponding light sensor 32 so that the field of vision is further narrowed.

Each beam of light 22 transmitted from second transmitting means 35 is collimated by second collimating means 48 similar to first collimating means 36. Ambient and scattered light is filtered from each light sensor 34 in second sensing means 26 by a second filtering means 50 similar to first filtering means 42.

Referring to FIG. 2, the preferred embodiment for transmitter/sensor assembly 12 is a "U" shaped configuration so that beams of light 18 transmitted from first transmitting means 16 are parallel with each other and are directly aligned with corresponding light sensors 34 in second sensing means 26. Similarly, beams of light 22 transmitted from second transmitting means 20 are parallel with each other and are directly aligned with corresponding light sensors 32 in first sensing means 24. In this configuration, beams of light 18 transmitted from first transmitting means 16 are also parallel to beams of light 22 transmitted from second transmitting means 20.

Referring to FIG. 2 and FIG. 3, in the preferred embodiment light sources 28 and light sensors 32 are placed adjacent to each other in an offset alternating pattern. Light sources 30 and light sensors 34 are similarly situated.

Referring to FIG. 1 and FIG. 3, light sources 28 in first transmitting means 16 are connected to decoder/driver 52 through interconnections 54. Light sources 30 in second transmitting means 20 are connected to decoder/driver through interconnections 56. Transmitter decoder/driver 52 is a UCN-5816A decoder/latch/sink driver or similar device. Transmitter decoder/driver 52 has a number of individual output lines at least equal to the sum of the number of light sources 28 in first transmitting means 16 and light sources 30 in second transmitting means 20. Transmitter decoder/driver 52 serves to selectively address light sources 28 and light sources 30, isolate light sources 28 and light sources 30 from control unit/processor 58, and to provide sufficient current to activate each light source. To control sixteen data output lines with a binary coded address of zero to fifteen, at least four address lines are required. Transmitter driver/decoder 52 decodes the address sent from control unit processor and sends a signal to activate the corresponding light source 28 in first transmitting means 16 or the corresponding light source 30 in second transmitting means 20. This will control which of light source is turned on at any given time to transmit a beam of light across inspection zone 14. Transmitter decoder/driver 52 is addressed by control unit/processor 58 through interconnections 60.

Each light source 28 in first transmitting means 16 and each light source 30 in second transmitting means 20 is connected to current modulator 62 through common interconnection 64. FIG. 4 shows a typical configuration of current modulator 62 as discrete components comprising a discrete current switching circuit which is controlled by control unit/processor 58 through interconnections 66 and 68. When current modulator 62 is switched on at different output levels, the current flow through a light source is varied thereby varying the intensity of the beam of light it projects. Interconnections 66 and 68 can be switched on independently or together, thus providing three levels of current output; that is, low, medium, and high current output thereby providing three levels of output from light sources 28 and light sources 30.

As an alternative embodiment of current modulator 62, an addressable decoder latch driver could be used to provide additional levels of modulation intensity. An eight bit decoder latch driver would provide up to sixty-four levels of current addressed by control unit/processor 58.

To ensure that light sources 28 in first transmitting means 16 and light sources 30 in second transmitting means 20 are activated only when desired and to protect against continuous high current conditions, decoder/driver 52 also has an enable input connected to control unit/processor 58 through interconnection 70. Decoder/driver 58 will only decode the address sent on interconnections 60 when an enable signal is sent through interconnection 70.

Each light sensor 32 in first sensing means 24 and each light sensor 34 in second sensing means 26 is connected to a separate current to voltage convertor in current to voltage converter module 72 through interconnections 74 and 76, respectively. Current to voltage converter module 72 is an LF277 ACN or similar device containing multiple converters. Discrete components or individual operational amplifiers could also be used. These convertors are used to match the output impedance of the light sensors to the input impedance of first multiplexer 78 and second multiplexer 80 and to act as a first stage of amplification to produce an output level sufficient to drive first multiplexer 78 and second multiplexer 80.

First multiplexer 78 and second multiplexer 80 are each an HEF 4051 or similar device, or a circuit comprising discrete components. First multiplexer 78 and second multiplexer 80 each have a number of data input lines at least equal to the number of light sensors 32 in first sensing means 24 and the number of light sensors 34 in second sensing means 26, respectively. First multiplexer 78 and second multiplexer 80 are connected to control unit/processor 58 through common address lines 60. First multiplexer 78 and second multiplexer 80 each have a number of address lines determined by the number of data input lines to be controlled. To control sixteen data input lines with a binary coded address of zero to fifteen, at least four address lines are required.

Decoder/driver 52 is connected to control unit/processor 58 through address lines 61. An address is sent to decoder/driver 52 to select a light source and, in addition, an address is sent to first multiplexer 78 and second multiplexer 80 to select the desired light sensor. First multiplexer 78 and second multiplexer 80 decode that address and receive data only from the light sensor desired to be sampled at that time.

Because they share common address lines, first multiplexer 78 and second multiplexer 80 are individually selected through an enable line so that only one light sensor is selected at a time. This is an additional feature to filter ambient and scattered light because only one sensor is selected at a time. This also permits the apparatus to operate in either of two separate modes of operation. For example, in a transmittance detection mode, a light source 28 in first transmitting means 16 would be activated. Correspondingly, second multiplexer 80 would be activated to accept data from a light sensor 34 in second sensing means 26. This would be done by sending an enable signal to second multiplexer 80 from control unit processor 58 through interconnection 82 to invertor 84 and through interconnection 86. The same signal that enables second multiplexer 80 also disables first multiplexer 78. As a result, only the light sensor 34 directly opposite light source 28 would be activated to sense light transmitted through article of produce 10. Alternatively, in a reflectance detection mode, first multiplexer 78 would be enabled instead. Enabling first multiplexer 78 disables second multiplexer 80 and a light sensor 32 adjacent to a light source 28 would be activated to sense light reflected off of article of produce 10.

The outputs of current to voltage converter module 72 are connected to inputs of first multiplexer 78 and second multiplexer 80 through interconnections 88 and 90, respectively. The outputs of first multiplexer 78 and second multiplexer 80 are combined and are connected to the input of first amplifier 92 through interconnection 94. First amplifier 92 is a conventional operational amplifier such as a 411 ACN or similar device, or a circuit comprising discrete components. The gain of first amplifier 92 is approximately forty. This provides an additional stage of amplification and conditions the data by acting as a low pass filter.

The output of first amplifier 92 is connected to the input of second amplifier 96 through interconnection 98. Second amplifier 96 is also a conventional operational amplifier such as a 411 ACN or similar device, or a circuit comprising discrete components. The gain of second amplifier 96 is approximately twenty. This provides an additional stage of amplification and conditions the data by acting as a low pass filter.

The use of successive stages of amplification rather than a high gain single stage provides high gain with low distortion.

The output of second amplifier 96 is connected to one of the analog input channels of control unit/processor 58 through interconnection 100. Protection diodes can also be used on the output of amplifier 96 to protect the analog input channel of control unit/processor 58.

The output of second amplifier 96 is also connected to comparator 102 through interconnection 100. Comparator 102 is a standard comparator such as a LM 3302 or similar device operating in the differential mode, or a circuit comprising discrete components. Bias adjustment 104 sets a reference voltage through interconnection 106 to detect the presence of an article of produce 10 in inspection zone 14. The output of comparator 102 is connected to an input of control unit/processor 58 through interconnection 108. Comparator 102 allows for extremely high speed comparison to save processing time.

The combined outputs of first multiplexer 78 and second multiplexer 80 are also connected to the input of follower 110, which is a unity gain amplifier, through interconnection 94. The output of follower 110 is connected to a separate analog input channel of control unit/processor 58 through interconnection 112.

Control unit/processor 58 can be a circuit comprising discrete components or preferably a digital computer or microprocessor. The preferred embodiment uses a 80535/515 microprocessor because of its high speed, compact size, and ability to perform several functions. This particular device also contains an integral analog to digital converter. For faster scan times, and to enable control unit/processor 58 to have additional time to process data, and external "flash" analog to digital convertor could be used ahead of the data bus. Use of this type of analog to digital convertor would increase the speed of data conversion considerably.

In a pit detecting or similar accept/reject configuration, control unit/processor 58 is connected to driver 114 through interconnection 116. Driver 114 is a discrete field effect transistor, conventional bipolar switch, relay, or other switching device. Driver 114 is connected to air valve 118 through interconnection 120. Air valve 118 is connected to air supply 122 through air line 124. Nozzle 126 is connected to air valve 118 through air line 128.

The method of operation of the apparatus described above and the method of inspecting produce follows by way of example and not of limitation.

Operation starts with control unit/processor 58 initiating a master timing cycle. The master timing cycle repeats itself at the end of approximately one millisecond and is broken in two sub-periods. The first sub-period is the scanning period. The second sub-period is the wait period. The length of the scanning sub-period is approximately seven-hundred microseconds. The length of the wait sub-period is approximately one millisecond minus the length of the scanning sub-period.

Control unit/processor 58 initiates a low power scanning cycle by sending a signal to current modulator 62 to operate in its low current mode. As will be explained further, current modulator 62 can also be operated in a medium current mode for calibration operations, and a high current mode for high power scanning cycles.

Control unit/processor 58 sends a binary coded address to decoder/driver 52 to designate which light source in first transmitting means 16 or second transmitting means 20 is to be activated. The same binary coded address is sent to first multiplexer 78 and second multiplexer 80 to designate which light sensor in first sensing means 24 or second sensing means 26 is to be activated, except that the high address bit is used to select whether first multiplexer 78 or second multiplexer 80 is to be enabled. Control unit/processor 58 also sends an enable signal to decoder/driver 52.

Assuming the use of eight light sources in first transmitting means 16 and eight light sources in second transmitting means 20, for illustrative purposes individual light sources will be described by using the subscript n (e.g., $16_n$ and $20_n$) where n is an incrementing counter.

During a scan, for n=1 the corresponding light source $16_n$ in first transmitting means 16 is activated. That light source is then deactivated and the corresponding light source $20_n$ in second transmitting means 20 is activated. That light source is then deactivated and counter n is incremented to n=n+1. The corresponding light source $16_n$ in first transmitting means 16 is then activated. That light source is then deactivated and the corresponding light source $20_n$ in second transmitting means 20 is activated. Selection of light sources alternates between light sources in first transmitting means 16 and light sources in second transmitting means 20 until counter n=9. At this point all light sources have been activated and the transmittance scanning cycle ends.

During a low power scanning cycle, each light source is activated for approximately 20 microseconds. During a high power scanning cycle, each light source is activated for approximately 25 microseconds.

While all light sources 28 in first transmitting means 16 and all light sources 30 in second transmitting means 20 could be activated simultaneously, the preferred method is to select one at a time so that the transmitted light beams do not interfere with each other. Furthermore, while all light sources 28 in first transmitting means 16 could be activated before activating light sources 30 in second transmitting means 20, the preferred method is to alternate between first transmitting means 16 and second transmitting means 20 in the manner described above. The result is to produce a high resolution scan and to compensate for errors which might be introduced if article of produce 10 is not centered in inspection zone 14, or the pit is located to the side of article of produce 10 as opposed to being centered. This approach will also detect pits in halved fruit whether article of produce 10 is oriented "cup up" or "cup down".

For a transmittance scan, when an individual light source in first transmitting means 16 is activated, its corresponding light sensor in second sensing means 26 is activated. Similarly, when an individual light source in second transmitting means 20 is activated, its corresponding light sensor in first sensing means 24 is activated. Note that in this mode of operation the light source and light sensor being activated are directly opposite and across inspection zone 14 from each other.

For a reflectance scan, when an individual light source in first transmitting means 16 is activated, the corresponding light sensor in first sensing means 24 is activated. Similarly, when an individual light source in second transmitting means 20 is activated, its corresponding light sensor in second sensing means 26 is activated. Note that in this mode of operation the source and light sensor being activated are adjacent to each other and are on the same side of inspection zone 14.

When an individual light source is activated, its corresponding light sensor produces an output current level which is proportional to the intensity of the light beam received. The output current is converted to voltage by the corresponding current to voltage convertor. First multiplexer 78 or second multiplexer 80, depending upon which is enabled by control unit/processor 58, accepts data only from the light sensor corresponding to the light source activated. The outputs of first multiplexer 78 and second multiplexer 80 are combined, amplified and conditioned by first amplifier 92, and further amplified and conditioned by second amplifier 96.

The output of second amplifier 96 is then accepted and processed by control unit/processor 58. During a low power scanning cycle, control unit/processor 58 stores the data as it is received from second amplifier 96. During a high power scanning cycle, control unit/processor 58 samples the output of second amplifier 96 multiple times and averages the samples before storing the data. This permits the use of short, high power pulses of light by compensating for rise and fall times of the pulses and canceling noise in the sensed data.

During the low power scanning cycle, control unit/processor 58 monitors the output of comparator 102. Comparator 102 compares the output of second amplifier 96 against a preset threshold established by bias adjustment 104. When inspection zone 14 is empty, the intensities of the transmitted beams of light do not vary and the output of second amplifier 96 is above the threshold level established by bias adjustment 104.

When article of produce 10 is introduced into the inspection zone 14, it will absorb a portion of the transmitted light beam and the output of second amplifier 96 will decrease. Bias adjustment 104 is set to a level that will allow detection of only the article of produce 10 being inspected and avoid detection of debris or other objects passing through inspection zone 14. Control unit/processor 58 samples the output of comparator 102 while each light source is activated and stores as additional data which of the corresponding light sensors detected the presence of article of produce 10.

If at the end of the low power scanning cycle control unit/processor 58 detected a decrease in intensity to below the threshold level established by bias adjustment 102, it sends a signal to current modulator 62 to switch from low current mode to high current mode. As a result, the light sources are allowed to draw more current and the intensity of beams of light increases.

The scanning cycle is then repeated, either as a low power scanning cycle or, if article of produce 10 was detected during the previous low power scanning cycle, as a high power transmittance scanning cycle followed by a high power reflectance scanning cycle. During a high power scanning cycle, data is collected only from those light sensors which detected the presence of article of produce 10 during the previous low power scanning cycle.

At the end of the scanning sub-period of the master timing cycle, control unit/processor 58 waits before initiating the next scanning cycle. During this period, intermediate processing is performed. Control unit/processor 58 disables decoder/driver 52 and enables first multiplexer 78 to accept data from one light sensor. At this time, control unit/processor 58 samples the output of second amplifier 96 and determines the steady state output level which represents ambient light and noise in the system. This "offset" level is later subtracted from the data levels that were measured during the scanning cycles. This serves to normalize the data levels measured by eliminating the naturally occurring voltage offset which is inherent to some degree in operational amplifiers.

The light sources are then allowed to rest before being activated again. This reduces power consumption and increases the life of the light sources. This is particularly important because it allows the light sources to produce very high intensity beams during the high power scan under a very low duty cycle. The advantage of a high intensity beam of light is that it will penetrate article of produce 10 more readily than a low intensity beam of light. The light sources will also be very reliable and maintain constant light output over the life of the apparatus.

After a high power scanning cycle, the next scanning cycle is a low power scanning cycle. If the presence of article of produce 10 is no longer detected by comparator 102, the "offset" level from steady state operation is computed and an automatic calibration procedure is performed. Control unit/processor 58 then sends a signal to current modulator 62 to operate at a medium current level and, in turn, activates each light source 28 in first transmitting means 16 and each light source 30 in second transmitting means 20. The corresponding light sensors directly opposite each light source are sampled and data from the output of follower 110 is stored and processed by control unit/processor 58. Data from this medium power scan when article of produce 10 is not present is used to compare the output from each light source to a known value. Each light source is then internally recalibrated by control unit/processor 58 so that it operates on a normalized basis. This process compensates for drift in the emitters, detectors, and current to voltage convertors, and further compensates for any build up of foreign material on the lenses of the detectors.

Control unit/processor then processes the data collected from the scanning cycles while it waits for the next article of produce 10 to pass through inspection zone 14.

Data collected during a low power scanning cycle is processed to determine the size of article of produce 10 by comparing the data levels generated from each light sensor as article of produce 10 passed through inspection zone 14. As article of produce 10 passed through inspection zone 14, the output level of some of the light sensors remained constant while others decreased as the result of article of produce 10 being in the path of the light sources. By correlating which light sensor outputs remained constant with those that changed, the outer boundaries of article of produce 10 can be determined. Since the physical spacing of the light sources and light sensors is a known value, as is the speed of article of produce 10 as it travels through inspection zone 14, the size and symmetry of article of produce 10 in inspection zone 14 can be determined. The size of and symmetry of article of produce 10 can be determined since multiple low power scans are made as article of produce 10 passes through inspection zone 14.

Data collected from a high power scanning cycle is processed to determine the light transmittance and reflectance characteristics of article of produce 10. Since data was collected only from light sensors which detected article of produce 10 during the previous low power scan, the only data processed will be that which represents the light transmittance and reflectance characteristics of article of produce 10 and not the areas of inspection zone 14 adjacent to and surrounding article of produce 10. Since higher density is reflected by lower light transmittance and lower sensor output levels, variations in density of article of produce 10 are determined by correlating the variations in sensed data. Light transmittance and reflectance characteristics of article of produce 10 can be determined in two dimensions since multiple high power scans are made as article of produce 10 passes through inspection zone 14.

In a pit detection mode, control unit/processor 58 analyzes the data collected during the high power scanning cycles to determine the whether the data exceeds pre-determined thresholds on a sensor by sensor basis. The first determination is whether density exceeds the threshold for that sensor. If it does, then reflectance is also checked. The purpose of this dual checking scheme is that some fruits such as apricots could be green and erroneously demonstrate unacceptable density characteristics due to the color and not the presence of a pit. Therefore, both unacceptable density and reflectance characteristics would have to be present before the determination that a pit is present would be made.

The number of detections corresponding to the presence of a pit in article of produce 10 is compared to an additional threshold for determination of the presence of a pit when viewing article of produce 10 as a whole. If the reject criteria is met, then control unit/processor 58 sends a signal to driver 114 which in turn switches on and actuates air valve 118. Air valve 118 feeds air from air supply 122 to nozzle 126 which in turn blasts air at article of produce 10, thus diverting article of produce 10 from further processing.

The preferred embodiment tests for unacceptable density and reflectance characteristics first on a sensor by sensor basis and then for the article of produce as a whole. However, alternative detection criteria may be better suited for different types of produce. These criteria would include density only, reflectance only, density and reflectance on a sensor by sensor basis, and density and reflectance as a whole. By varying these criteria, the apparatus can be customized for pit detection, defect detection, color sorting, and combinations of the foregoing. None of these modes of operation would require the size of article of produce 10 to be computed.

Alternatively, for pit detection the lowest data level from first sensing means 24 and from second sensing means 26 could be examined. These two data levels would represent the highest density area in article of produce 10. Control unit/processor 58 would calculate the numerical average of the two data levels and compare it to a threshold which is determined from the size of article of produce 10. Thresholds for various sizes are determined from test data collected for articles of produce which do not contain pits. If the numerical average of the two data levels is lower than the threshold corresponding to the size of article of produce 10 or, if in combination with the density of article of produce 10 being greater than the threshold level other criteria such as unacceptable reflectance characteristics are met, article of produce 10 is deemed to contain a pit.

Furthermore, an alternative approach for detection of defects would be where control unit/processor 58 would sort the data collected during the high power scanning cycles to determine a group of lowest data levels from first sensing means 24 and a group of lowest data levels from second sensing means 26. Typically each group would consist of the ten lowest data levels for that axis. The data levels would be numerically averaged and compared to a threshold which is determined from the size of article of produce 10. Thresholds for various sizes would be pre-determined from test data collected for articles of produce which contain defects. It should be apparent that the data level for a defect is not as low as for a pit since a pit has a much higher density. Therefore, by averaging a group of lowest data levels the resulting value will be higher than for the average of the two lowest values taken in the pit detection mode. If the numerical average of the data levels is lower than the threshold corresponding to the size of article of produce 10 or, if in combination with the density of article of produce 10 being greater than the threshold level other criteria such as unacceptable reflectance characteristics are met, article of produce 10 would be rejected.

FIGS. 5A through 5H show a flow chart for the general sequence of instructions that could be used where control unit/processor 58 is a digital computer or microprocessor. While the flow chart is representative of the steps that can be used to accomplish these functions, actual programs embodying these steps can vary.

The sequence begins at step 200 where initialization takes place and the master timing cycle begins.

At step 202, a loop is entered for a low power scan. Counter N is set at an initial value of one. Throughout the scanning process, counter N will represent a variable which is incremented to select a particular light source or sensor to be activated.

At step 204, a loop is entered and the light source in first transmitting means 16 corresponding to the value of counter N is activated.

At step 206, the light sensor in second sensing means 26 corresponding to the value of counter N is activated and the resulting data is input and saved.

At step 208 a loop is entered where the output level from the light sensor is compared against a threshold. If the output level is greater than the threshold value, article of produce 10 has not been detected in inspection zone 14. If the output level is less than the threshold value, article of produce 10 has been detected in the inspection zone 14 and an object detect flag is set for that sensor at step 210.

At step 212, the light source is turned off.

At step 214, the light source in second transmitting means 20 corresponding to the value of counter N is activated.

At step 216, the light sensor in first sensing means 24 corresponding to the value of counter N is activated and the resulting data is input and saved.

At step 218 a loop is entered where the output level from the light sensor is compared against a threshold. If the output level is greater than the threshold value, article of produce 10 has not been detected in inspection zone 14. If the output level is less than the threshold value, article of produce 10 has been detected in inspection zone 14 and an object detect flag is set for that sensor at step 220.

At step 222, the light source is turned off.

At step 224, counter N is incremented by one. The value of counter N is then tested at step 226 to determine if all of the light sources have been selected. For eight light sources in first transmitting means 16 and eight light sources in second transmitting means 20, counter N would be tested against the value nine. If all of the light sources have not been selected, the loop is continued at step 204.

If all of the light sources have been selected, the data collected during the low power scan is tested at step 228 to determine if the object detect flag had been set during the low power scan loop. If an object detect flag was not set during the low power scan loop, the sequence jumps to setp 296. If an object detect flag was set during the low power scan loop, the sequence continues at step 230 where counter N is set to the initial value of one. A high power transmittance scanning loop is then entered at step 232 and the light source in first transmitting means 16 corresponding to the value of counter N is activated.

At step 234, the light sensor in second sensing means 26 corresponding to the value of counter N is activated and the resulting data is input and saved.

At step 236, the light source is turned off.

At step 238, the light source in second transmitting means 20 corresponding to the value of counter N is activated.

At step 240, the light sensor in first sensing means 24 corresponding to the value of counter N is activated and the resulting data is input and saved.

At step 246, the light source is turned off.

At step 248, counter N is incremented by one. The value of counter N is then tested at step 250 to determine if all of the light sources have been selected. For eight light sources in first transmitting means 16 and eight light sources in second transmitting means 20, counter N would be tested against the value nine. If all of the light sources have not been selected, the loop is continued at step 232.

If all of the light sources have been selected, a high power reflectance scanning loop is then entered at step 252 where counter N is set to a value of one.

At step 254, the light source in first transmitting means 16 corresponding to the value of counter N is activated.

At step 256, the light sensor in first sensing means 24 corresponding to the value of counter N is activated and the resulting data is input and saved.

At step 258, the light source is turned off.

At step 260, the light source in second transmitting means 20 corresponding to the value of counter N is activated.

At step 262, the light sensor in second sensing means 26 corresponding to the value of counter N is activated and the resulting data is input and saved.

At step 264, the light source is turned off.

At step 266, counter N is incremented by one. The value of counter N is then tested at step 268 to determine if all of the light sources have been selected. For eight light sources in first transmitting means 16 and eight light sources in second transmitting means 20, counter N would be tested against the value nine. If all of the light sources have not been selected, the loop is continued at step 254.

If all of the light sources have been selected, a data analysis loop is entered at step 270 and counter N is reset to the value one. This loop checks, on a sensor by sensor basis, whether density and/or reflection criteria are met from light beams transmitted from first transmitting means 16 in both the transmittance mode and the reflectance mode. It should be noted that there a eight sensors in first sensing means 24 and second sensing means 26, and that each sensor has received data from both a transmittance scan and a reflectance scan. Therefore, there are sixteen data values available for comparison with a threshold in this loop.

At step 272, the transmittance scan value from the sensor in second sensing means 26 corresponding to the value N is compared against a density threshold. If the density is greater than the threshold level, step 274 is executed. Otherwise, the routine jumps to step 278 because a pit was not detected.

At step 274, the reflectance scan value from the sensor in first sensing means 24 corresponding to the value N is compared to a reflectance threshold. If the reflectance is greater than the threshold level, a pit detection flag is set a step 276. Otherwise, the routine jumps to step 278 because a pit was not detected.

It can be seen at this point that both the density criteria and the reflectance criteria must be met in order for the pit detection flag to be set.

At step 278, counter N is incremented by the value of one.

At step 280, the value of counter N is tested. For sixteen sensors the test value is nine. This is because data from the sensors reactive to the emitters in first transmitting means 16 only are tested in this loop. If the value of counter N equals nine, the routine continues at step 282. Otherwise it returns to step 272.

At step 282, a second data analysis loop is entered and counter N is reset to the value one. Similar to the previous loop this loop checks, on a sensor by sensor basis, whether density and/or reflection criteria are met from light beams transmitted from second transmitting means 20 in both the transmittance mode and the reflectance mode.

At step 284, the transmittance scan value from the sensor in first sensing means 24 corresponding to the value N is compared against a density threshold. If the density is greater than the threshold level, step 286 is executed. Otherwise, the routine jumps to step 290 because a pit was not detected.

At step 286, the reflectance scan value from the sensor in second sensing means 26 corresponding to the value N is compared to a reflectance threshold. If the reflectance is greater than the threshold level, a pit detection flag is set a step 288. Otherwise, the routine jumps to step 290 because a pit was not detected.

At step 290, counter N is incremented by the value of one.

At step 292, the value of counter N is tested. For sixteen sensors the test value is nine. This is because data from the sensors reactive to the emitters in second transmitting means 20 only are tested in this loop. If the value of counter N equals nine, the routine continues at step 294. Otherwise it returns to step 284.

At step 284 a loop is entered to check the master timing cycle to determine if it is time for the next scan. If it is not time for the next scan, then step 284 is repeated. If it is time for the next scan, the master timing cycle is reset and the loop for a low power scan is entered at step 202.

At step 296, the object detect flag is analyzed to determine if article of produce 10 was present in inspection zone 14 during a previous low power scan. If article of produce 10 was not present in inspection zone 14 during a previous low power scan, the sequence continues at step 294 to determine if it is time for the next scan.

If article of produce 10 was present during a previous low power scan but was not present during the current low power scan, data collection is complete and the sequence would continue at step 298. At step 298, control unit/processor 58 would compute the steady state output level of one of the light sensors which represents ambient light and noise in the system. This "offset" level is subtracted from the data levels that were measured during the scanning cycles. This serves to normalize the data levels measured by eliminating the naturally occurring voltage offset which is inherent to some degree in operational amplifiers.

At step 300, an automatic calibration procedure would be performed. Control unit/processor 58 would send a signal to current modulator 62 to operate at a medium current level and, in turn, activates each light source 28 in first transmitting means 16 and each light source 30 in second transmitting means 20. The corresponding light sensors directly opposite each light source are sampled and data from the output of follower 110 would be stored and processed by control unit/processor 58. Data from this medium power scan when article of produce 10 is not present would be used to compare the output from each light source to a known value. Each light source would then be internally recalibrated by control unit/processor 58 so that it operates on a normalized basis.

At step 302, the size of article of produce 10 would be determined from the data collected during the low power scans. At step 304, the size of article of produce 10 would be used to determine the appropriate density threshold for an article of produce of this size which does not contain a pit.

At step 306, the number of flagged pit detections would be compared against a threshold which, on an overall basis, would determine the presence of a pit when considering article of produce 10 as a whole.

At step 308, the data collected is tested against various reject criteria depending upon the manner in which the apparatus is used. If the reject criteria were met, then the sequence would continue at step 310 and a reject valve operated. Otherwise, the sequence would jump to step 294 to determine if it were time for a new scan.

While the preferred embodiment uses density and reflectance on a sensor by sensor basis and also as a whole to determine the total number of pit detection flags which were set and to reject the object if the total number of pit detection flags exceeds a threshold level, other criteria may be better suited to various types of produce. Those criteria include density only, reflectance only, density and reflectance on a sensor by sensor basis, and density and reflectance as a whole.

Accordingly, it will be seen that this invention can be used to accurately and efficiently inspect produce for the presence of pits at high speeds. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A method for inspecting an article of produce passing through an inspection zone, comprising the steps of:
   (a) sequentially transmitting a first plurality of substantially parallel beams of light across an inspection zone;
   (b) sequentially transmitting a second plurality of substantially parallel beams of light across said inspection zone in a direction substantially opposite to the direction of said first plurality of beams of light;
   (c) alternating between transmitting a beam of light in said first plurality of beams of light and transmitting a beam of light in said second plurality of beams of light;
   (d) sequentially sensing the intensity of each of said beams of light transmitted through an article of produce passing through said inspection zone, said sensing occurring along the axis of transmission of each of said beams of light;
   (e) sequentially sensing the intensity of each of said beams of light reflected by said article of produce; and
   (f) processing the sensed data to determine the light transmittance and reflectance characteristics of said article of produce based on variations in intensity of said sensed data, whereby the presence of a pit, defect, abnormality, or other internal or external characteristic of said article of produce is detected.

2. The method as recited in claim 1, further comprising the steps of:
   (a) detecting the presence of said article of produce in said inspection zone; and
   (b) modulating the transmission intensity of said beams of light in response to the presence of said article of produce in said inspection zone.

3. The method as recited in claim 2, further comprising the step of alternating between sensing the intensity of each said beam of light in said first plurality of beams of light and sensing the intensity of each said beam of light in said second plurality of beams of light.

4. The method as recited in claim 1, wherein each of said beams of light comprise highly collimated light rays.

5. The method as recited in claim 1, wherein said beams of light are infrared light.

6. The method as recited in claim 1, wherein said beams of light are visible light.

7. An apparatus for inspecting an article of produce passing through an inspection zone, comprising:
   (a) first transmitting means for sequentially transmitting a first plurality of substantially parallel beams of light across an inspection zone;
   (b) second transmitting means for sequentially transmitting a second plurality of substantially parallel beams of light across said inspection zone in a direction substantially opposite to the direction of said first plurality of beams of light;
   (c) means for alternating between transmitting a beam of light in said first plurality of beams of light and transmitting a beam of light in said second plurality of beams of light;
   (d) means aligned with said first transmitting means for sequentially sensing the intensity of each of said beams of light in said first plurality of beams of light transmitted through an article of produce passing through said inspection zone;
   (e) means aligned with said second transmitting means for sequentially sensing the intensity of each of said beams of light in said second plurality of beams of light transmitted through said article of produce;
   (f) means positioned adjacent to said first transmitting means for sequentially sensing the intensity of each of said beams of light in said first plurality of beams of light reflected by said article of produce;
   (g) means positioned adjacent to said second transmitting means for sequentially sensing the intensity of each of said beams of light in said second plurality of beams of light reflected by said article of produce; and
   (h) processing means for processing the sensed data to determine the light transmittance and reflectance characteristics of said article of produce based on variations in intensity of said sensed data, whereby the presence of a pit, defect, abnormality, or other internal or external characteristic of said article of produce is detected.

8. The apparatus as recited in claim 7, further comprising:
   (a) first collimating means for collimating the light rays in each beam of light in said first plurality of beams of light; and
   (b) second collimating means for collimating the light rays in each beam of light in said second plurality of beams of light.

9. The apparatus as recited in claim 7, wherein:
   (a) said first transmitting means comprises a first plurality of infrared emitters;
   (b) said second transmitting means comprises a second plurality of infrared emitters;
   (c) said first sensing means comprises a first plurality of infrared detectors; and
   (d) said second sensing means comprises a second plurality of infrared detectors.

10. The apparatus as recited in claim 9, wherein each said infrared emitter has an angle of dispersion of less than approximately twelve degrees.

11. The apparatus as recited in claim 10, wherein each said infrared detector has an acceptance angle of less than approximately twelve degrees.

12. The apparatus as recited in claim 7, further comprising means for alternating between sensing beams of light in said first plurality of beams of light and sensing beams of light in said second plurality of beams of light.

13. The apparatus as recited in claim 7, further comprising:
   (a) means for detecting the presence of said article of produce in said inspection zone; and
   (b) means for modulating the transmission intensity of said beams of light in response to the presence of said article of produce in said inspection zone.

14. The apparatus as recited in claim 7, wherein said processing means comprises a programmed data processor.

15. An apparatus for detecting the presence of a pit, defect, abnormality, or other internal or external characteristic of an article of produce passing through an inspection zone, comprising:
   (a) first transmitting means for sequentially transmitting a first plurality of substantially parallel beams of light across an inspection zone;
   (b) second transmitting means for sequentially transmitting a second plurality of substantially parallel beams of light across said inspection zone in a direction substantially opposite to the direction of said first plurality of beams of light;
   (c) means for detecting the presence of an article of produce passing through said inspection zone and increasing the intensity of said beams of light in response thereto;
   (d) first sensing means for sequentially sensing the intensity of each beam of light in said first plurality of beams of light passing through said inspection zone;
   (e) second sensing means for sequentially sensing the intensity of each beam of light in said second plurality of beams of light passing through said inspection zone;
   (f) third sensing means for sensing the intensity of each beam of light in said first plurality of beams of light reflected by said article of produce, said third sensing means positioned adjacent to said first transmitting means;
   (g) fourth sensing means for sensing the intensity of each beam of light in said second plurality of beams of light reflected by said article of produce, said fourth sensing means positioned adjacent to said second transmitting means;
   (h) means for alternating between transmitting a beam of light in said first plurality of beams of light and transmitting a beam of light in said second plurality of beams of light; and
   (i) processing means for processing the sensed data to determine the light transmittance and reflectance characteristics of said article of produce based on variations in intensity of said sensed data.

* * * * *